United States Patent Office 3,360,496
Patented Dec. 26, 1967

3,360,496
HEAT SHRINKABLE COMPOSITIONS
Donald E. Weyer, Midland, Mich., assignor to Dow Corning Corporation, Midland, Mich., a corporation of Michigan
No Drawing. Filed Sept. 21, 1964, Ser. No. 398,029
6 Claims. (Cl. 260—37)

ABSTRACT OF THE DISCLOSURE

Organosilicon heat-shrinkable compositions which retain heat-shrinkable properties for long periods of time under storage conditions and which will have maximum stress-strain properties, providing tensile strengths upward of 900 p.s.i. and elongations upward of 100%. An illustrative composition being 100 parts by weight of a copolymer gum comprising a dimethylvinylsiloxy-end-blocked copolymer of 99.86 mol percent dimethylsiloxane and 0.14 mol percent methylvinylsiloxane, 65 parts of fume silica, 15 parts of a hydroxylated methylsiloxane plasticizer and 2.5 parts dichlorobenzol peroxide.

The aforementioned copolymer gum is mixed with 45.5% by weight based on the weight of the gum of a block copolymer having the composition 48 mol percent dimethylsiloxane and 52 mol percent monophenylsiloxane. Said composition is molded by heating 5 minutes at 240° F. and cured 4 hours at 329° F. The resulting article is then heated to above the melting point of the resin, extended 200% in length and allowed to cool to room temperature.

---

This invention relates to organosilicon heat shrinkable elastomers.

Elastomeric compositions which alter their shape on the application of heat have an important place in commercial applications. For example, in the insulation of complex electrical conductors where extrusion over the conductor is not practical, one can apply a jacket over the conductor which is considerably larger than the diameter of the conductor and thereafter heat the jacket to cause it to shrink to produce a tight fitting coating. In addition, such materials are useful in caulking applications wherein a stretched elastomeric material is placed in the seam and then heated. It will thereupon shrink in length and expand in cross-section thereby forming a tight seam.

It is known from Belgium Patent 609,815, that certain silicone resins can be included in silicone elastomers in order to make heat shrinkable articles. According to said patent, the vulcanized elastomer containing the resin is heated and elongated and immediately quenched in cold water. Under these conditions, it is stated the elongated article will retain at least a part of its extension and will shrink to its original dimensions when again heated.

In commercial operation, however, it has been found that the combination of silicone rubber and organic or organosilicon resins taught in said patent suffer from serious defects. Organic resins, of course, do not have the thermal stability of silicone elastomers. Thus, the use of these materials in silicone rubber severely degrades the thermal stability of the mixture and often deleteriously affects the electrical properties of the mixture.

The type of organosilicon resins taught in said patent fail commercially because the stretched rubber article will not remain in stretched condition when subjected in the temperatures of the order of 100 to 130° F. (i.e. about 50° C.). When subjected to such temperatures for any length of time, the extended article loses its ability to shrink when heated. Since temperatures in this range are encountered in storage, a commercial item with such a defect suffers from a serious disadvantage. With some silicone resins the ability to retain the stretch is lost at room temperature and with others it cannot be obtained at all.

The precise reason for these difficulties is not known. One factor is a melting point of an organosilicon resin, but many resins having the required melting point still do not work.

Another problem which has been encountered with the use of silicone resins has been the loss in tensile strength encountered with the addition of sufficient resin to give the desirable shrink properties. Since the primary use of heat shrinkable articles is to retract and form a tight covering over a base member, the shrunk material is often under stress. Therefore, it is important that it have as good stress-strain properties as possible.

It is the object of this invention to provide heat shrinkable silicone rubber articles which will retain the heat shrinkable properties for long periods of time under storage conditions and which will have maximum stress-strain properties. Another object is to provide materials which have tensile strengths upward of 900 p.s.i. and elongations upward of 100%, and have improved tear strength. Other objects and advantages will be apparent from the following description.

This invention relates to a composition of matter consisting essentially of (1) a vulcanizable organopolysiloxane rubber consisting essentially of (A) a polymeric diorganosiloxane in which the substituents are of the group methyl, phenyl, vinyl, and $RCH_2CH_2$— radicals in which R is a perfluoroalkyl radical, at least 30% of said substituents being methyl, and (B) a filler for (A), and (2) from 10 to 65% by weight, based on the weight of (A) of an organopolysiloxane resin consisting essentially of (C) blocks of siloxane units of the formula

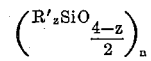

in which $n$ has an average value of from 6 to 100 inclusive, $z$ has an average value from 1.9 to 2 and R' is selected from the group consisting of methyl and phenyl radicals, there being no more than 10 mol percent phenylsiloxane in (C), and (D) siloxane blocks of the formula

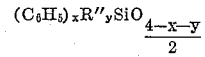

in which $x$ has an average value from .9 to 1.2, R" is a lower alkyl radical and $y$ has a value from 0 to 1, the prime mol ratio of (C) to (D) being from 30:70 to 60:40, (2) having a melting point of at least 50° C. and having overall from 1.3 to 1.65 total hydrocarbon groups per silicon atom.

The compositions of this invention are prepared by mixing (1) and (2) by any convenient manner. It has been found that satisfactory mixing is obtained on a standard rubber mill. The proportion of (1) and (2) is critical in order to obtain the desired properties of this invention. The order of mixing of the ingredients is not critical although, in general, it is best to mix the organopolysiloxane (A) with the filler and thereafter incorporate resin (2).

The compositions can be vulcanized with any suitable vulcanizing agent. Excellent results are obtained with organic peroxides such as those commonly employed with silicone rubber such as benzoyl peroxide, chlorobenzoyl peroxide, tertiarybutylperbenzoate, dicumyl peroxide, ditertiarybutyl peroxide, and the like.

(A) is essentially a diorganosiloxane in which the substituents are phenyl, methyl, vinyl and the defined perfluoroalkyl radicals. These materials are commercially available items and specific examples thereof are dimethylpolysiloxane, phenylmethylpolysiloxane, trifluoropropylmethylpolysiloxane; copolymers of dimethylsiloxane and methylvinylsiloxane; copolymers of trifluoropropylmethylsiloxane and vinylmethylsiloxane; copolymers of phenylmethylsiloxane and diphenylsiloxane; copolymers of dimethylsiloxane and diphenylsiloxane; copolymers of dimethylsiloxane, phenylmethylsiloxane and methylvinylsiloxane; vinyldimethyl-endblocked dimethylpolysiloxane; copolymers of

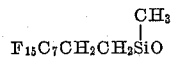

and methylvinylsiloxane; and copolymers of dimethylsiloxane and trifluoropropylmethylsiloxane. It should be understood that the polymers can also contain small amounts of monoorgano-substituted silicon atoms, triorgano-substituted silicon atoms and $SiO_2$ units.

The fillers employed in conjunction with (A) can be any of the standard fillers normally employed with silicone rubber. These include the so-called reinforcing fillers, such as carbon black, fume silica, silica aerogel or finely divided precipitated silicas; and the so-called extending fillers such as $TiO_2$, alumina, diatomaceous earth, crushed quartz, ferric oxide and calcium carbonate. For maximum stress-strain properties it is desirably used from 30 to 50 parts of the reinforcing fillers since amounts above and below these tend to degrade the physical properties.

It should be understood that the rubbers of this invention can also contain other additives normally used with silicone rubbers such as plasticizers to prevent premature hardening of the polymer-filler mix, thermal stability additives, antioxidants, flame retardants and pigments.

Compositions (2) employed herein are block copolymers and are prepared in accordance with the procedures set forth in the copending application of Harold L. Vincent, Serial No. 361,258, and Robert C. Antonen, Serial No. 361,212, both filed April 20, 1964. The disclosure of these applications is hereby incorporated by reference.

Basically, the resins are prepared by coupling preformed polymer of the formula

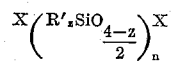

in which X is a reactive silicon-bonded group with ingredient (D). By employing this general method, the integrity of the (C) blocks is maintained so that one obtains a copolymer having (C) blocks and (D) blocks. For the purpose of this invention the average size of the (C) blocks can range from 6 to 100 units.

The block arrangement of the resins employed herein distinguishes them from conventional siloxane resins made by the cohydrolysis of monomeric silanes and/or by the equilibration of siloxanes with siloxane bond rearranging catalysts such as KOH. In these conventional resins there is a random distribution of the various siloxane units within the copolymer molecules.

The (C) blocks are made up substantially of dimethylsiloxane units, but can contain small amounts of monomethylsiloxane units. If desired, the (C) blocks can contain up to 10 mol percent of phenylsiloxane units such as phenylmethyl or diphenylsiloxane.

The other blocks (D) are essentially monophenylsiloxane units but the blocks can also contain up to 10 mol percent $SiO_2$ units, up to 20 mol percent diphenylsiloxane units, and up to 10 mol percent lower alkylphenylsiloxane units such as phenylmethyl, phenylethyl or phenylpropyl. The ratio of (C) to (D) in (2) should range from 30:70 to 60:40 prime moles. The term "prime mole" refers to the ratio of individual

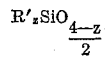

units to the individual

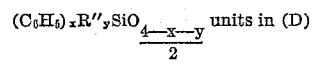

For example, where (C) is $(Me_2SiO)_b$ and (D) is $(C_6H_5SiO_{1.5})_c$, the mol ratio is calculated, based on unit weights 74 and 129.

In order to be operative in this invention, (2) must have a melting point of at least 50° C. and preferably of 100° C. Obviously, the melting point should be lower than the point of thermal degradation of the silicone rubber-resin mixture and preferably it should be not more than 250° C.

If desired, mixtures of the block copolymer resins and conventional random copolymer resins can be used provided the amount of block copolymer resin is at least 10% by weight of (A) and the total amount of block and random resins does not exceed 65% by weight of (A), and further that said mixtures have a melting point of at least 50° C. Said mixtures are included within the scope of the claims.

After ingredients (1) and (2) have been mixed and a suitable vulcanizing agent has been incorporated, the mixture is formed into the desired shape and then vulcanized. When peroxides are employed, it is best to vulcanize for 5 minutes at 240° F., and then heat for 4 hours at 392° F.

The vulcanized article is then heated to a temperature above the melting point of (2), elongated to the desired extent and maintained in the elongated position while being cooled to room temperature. The stress is then relieved and the article will remain in an extended state until it is again heated to a temperature above the melting point of the resin (2), whereupon it will shrink to approximately its original dimensions.

The compositions of this invention can be fabricated into articles of any desired type such as tubes, or solid elongated members for use in caulking applications or any other form which is desirable. For example, they can be fabricated into boots for spark plugs.

The following examples are illustrative only and should not be construed as limiting the invention which is properly delineated in the appended claims.

*Example 1*

In this example a comparison is shown between the properties obtained by employing the unique resins of this invention, those suggested in the aforesaid Belgium patent and other siloxane resins outside the scope of those claimed herein.

In all of the runs shown below the siloxane rubber (1) had the following composition: 100 parts by weight of a copolymer gum consisting of 94.36 mol percent dimethylsiloxane, .14 mol percent methylvinylsiloxane, and 5.50 mol percent diphenylsiloxane; 45 parts of a fume silica; .5 part $TiO_2$; 1 part ferric oxide and 1% based on the above of dichlorobenzoyl peroxide.

The siloxane resins employed for comparative purposes had the following formulations.

(I)

25 mol percent monomethylsiloxane
37 mol percent monophenylsiloxane
19 mol percent dimethylsiloxane, and
19 mol percent diphenylsiloxane.

(II)

70 mol percent monophenylsiloxane and
30 mol percent monopropylsiloxane.

(III)

65 mol percent monomethylsiloxane and 35 mol percent monophenylsiloxane.

(IV)

40 mol percent monophenylsiloxane
10 mol percent diphenylsiloxane
45 mol percent monomethylsiloxane and
5 mol percent phenylmethylsiloxane.

(V)

32 mol percent monophenylsiloxane
8 mol percent diphenylsiloxane
30 mol percent monomethylsiloxane and
30 mol percent phenylmethylsiloxane.

Each of the above resins was prepared by the cohydrolysis of the corresponding chlorosilanes.

The following resins were all block copolymers of $(Me_2SiO)_n$ blocks and monophenylsiloxane blocks, which in some cases, contain diphenyl or phenylmethylsiloxane units in the monophenyl blocks.

(VI)

46 mol percent monophenylsiloxane
4 mol percent diphenylsiloxane and
50 mol percent dimethylsiloxane.
The value of $n$ was 35.

(VII)

52 mol percent monophenylsiloxane and
48 mol percent dimethylsiloxane.
The value of $n$ was 35.

(VIII)

40.5 mol percent monophenylsiloxane,
4.5 mol percent phenylmethylsiloxane and
55 mol percent dimethylsiloxane.
The value of $n$ was 35.

(IX)

60 mol percent monophenylsiloxane
10 mol percent diphenylsiloxane and
30 mol percent dimethylsiloxane.
The value of $n$ was 35.

(X)

60 mol percent monophenylsiloxane and
40 mol percent dimethylsiloxane.
The value of $n$ was 95.

(XI)

60 mol percent monophenylsiloxane and
40 mol percent dimethylsiloxane.
The value of $n$ was 50.

(XII)

A blend of 50% by weight of a block copolymer of
50 mol percent monophenylsiloxane and
50 mol percent dimethylsiloxane, in which the value of $n$ was 35, and
50% by weight of a random copolymer of 40 mol percent monophenylsiloxane, 10 mol percent diphenylsiloxane, 5 mol percent phenylmethylsiloxane, and 45 mol percent monomethylsiloxane (resin IV).

Each of the above resins was mixed with the above silicone rubber in the amount of 29% by weight based on the weight of the copolymer gum, and in each case the mixture was heated 5 minutes at 240° F. and then cured 4 hours at 392° F. The resulting vulcanized article was then heated above the melting point of the resin and elongated 300%, if possible, i.e. was elongated four times its original length. The article was then cooled to room temperature and the stress was relieved. The article was then heated to 50° C. and the percent elongation retained was measured and recorded as percent "hold out." The article was then heated to 150° C. and the percent hold out recorded. The sample was considered a failure if it did not have a hold out of at least 100% at 50° C., i.e. the sample was at least twice its original length.

The stress-strain properties recorded were those of the original vulcanized sample after heating 4 hours at 392° F.

TABLE

| Resin No. | Durometer | Properties of Rubber | | | Percent Holdout | | Percent Shrinkage at 150° C. |
|---|---|---|---|---|---|---|---|
| | | Tensile in p.s.i. | Percent Elongation at break | Tear strength in lbs. per inch (die B) | 50° C. | 150° C. | |
| I | (¹) | (¹) | (¹) | (¹) | 0 | 0 | 0 |
| II | 64 | 655 | 460 | 123 | 30 | 10 | 90 |
| III | 74 | 823 | 390 | 149 | (²) | (²) | |
| IV | 70 | 780 | 430 | 129 | 30 | 10 | 90 |
| V | 67 | 723 | 483 | 142 | 35 | 5 | 95 |
| VI | 77 | 1,232 | 557 | 227 | 128 | 4 | 96 |
| VII | 76 | 1,494 | 530 | 178 | 156 | 6 | 94 |
| VII ³ | 82 | 1,249 | 470 | 126 | 215 | 4 | 93 |
| VIII | 67 | 1,058 | 640 | 161 | 140 | 8 | 92 |
| IX | 71 | 1,062 | 490 | 144 | 177 | 3 | 97 |
| X | 66 | 937 | 450 | 170 | 128 | 5 | 95 |
| XI | 69 | 952 | 490 | 170 | 138 | 6 | 94 |
| XII | 70 | 1,011 | 470 | 177 | 170 | 3 | 97 |

¹ Too soft to measure.
² Sample broke.
³ 43.5% by weight based on copolymer gum.

*Example 2*

This example illustrates the use of varying amounts of resin based on the weight of the copolymer gum. In this example, the silicone rubber employed was the same as that employed in Example 1 and the silicone resin employed was a block copolymer of 52 mol percent dimethylsiloxane, and 48 mol percent monophenylsiloxane in which $n$ had a value of 35.

The stress-strain properties and the percent hold out at 50° C. for the vulcanized rubber is shown in the table below.

TABLE

| Percent by wt. resin based on gum | Tensile in p.s.i. | Percent Elongation at break | Tear in pounds per inch | Percent hold out at 50° C. |
|---|---|---|---|---|
| 29 | 1,346 | 600 | 211 | 183 |
| 37 | 1,251 | 560 | 229 | 211 |
| 43.5 | 1,105 | 530 | 243 | 240 |
| 51 | 952 | 490 | 126 | 260 |

*Example 3*

The siloxane rubber employed in this example had a composition of 100 parts by weight of a copolymer gum comprising a dimethylvinylsiloxy-endblocked copolymer of 99.86 mol percent dimethylsiloxane and .14 mol percent methylvinylsiloxane, 65 parts of fume silica, 15 parts of a hydroxylated methylsiloxane plasticizer and 2.5 parts dichlorobenzoyl peroxide.

This rubber was mixed with 45.5% by weight based on the weight of the gum of a block copolymer having the composition 48 mol percent dimethylsiloxane and 52 mol percent monophenylsiloxane in which $n$ has a value of 35. The composition was molded by heating 5 minutes at 240° F. and then cured 4 hours at 329° F. The resulting article was then heated to above the melting point of the resin, extended 200% in length and allowed to cool to room temperature. Upon heating to 50° C., the hold out was 125%.

The physical properties of the vulcanized rubber containing the resin was as follows:

Tensile _____ p.s.i.____ 920
Elongation _____ percent____ 300
Tear _____ pounds per inch____ 98

*Example 4*

Suitable heat shrinkable materials are obtained when the following block copolymer resins are employed in the amount of 20% by weight, based on the weight of the gum in conjunction with the silicone rubber of Example 1.

(I) 50 mol percent of a polymer block of the average formula

and 50 mol percent monophenylsiloxane block.

(II) 50 mol percent of a siloxane block of the formula

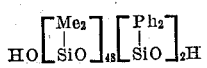

and 50 mol percent monophenylsiloxane block.

(III) 50 mol percent of a siloxane block of the average formula

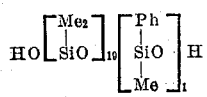

and a block composed of 48 mol percent monophenylsiloxane and 2 mol percent phenylethylsiloxane.

*Example 5*

Suitable heat shrinkable materials are obtained when the block siloxane resin of Example 3 is employed in amount of 30% by weight, based on the weight of the gums in the following rubber compositions:

100 parts of a copolymer of 99.5 mol percent

and .5 mol percent methylvinylsiloxane, 40 parts of a silica aerogel, 10 parts calcium carbonate.

100 parts of a copolymer of 93 mol percent dimethylsiloxane, and 7 mol percent phenylmethylsiloxane, and 35 parts of a fume silica.

That which is claimed is:
1. A composition of matter consisting essentially of
    (1) a vulcanizable organopolysiloxane rubber consisting essentially of
        (A) a polymeric diorganopolysiloxane in which the substituents are selected from the group consisting of methyl, phenyl, vinyl and RCH$_2$CH$_2$— radicals in which R is a perfluoroalkyl radical, at least 30% of said substituents being methyl, and
        (B) a filler for (A), and
    (2) from 10 to 65% by weight, based on the weight of (A) of an organopolysiloxane resin consisting essentially of
        (C) blocks of siloxane units of the average formula

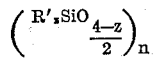

in which $n$ has an average value from 6 to 100 inclusive, $z$ has an average value from 1.9 to 2 inclusive, and R' is selected from the group consisting of methyl and phenyl radicals, there being no more than 10 mol percent phenylsiloxane in (C), and (D) blocks of the formula

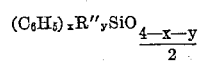

in which $x$ has a value from .9 to 1.2 inclusive, R'' is a lower alkyl radical and $y$ has a value from 0 to .1 inclusive, the prime mol ratio of (C) to (D) being from 30:70 to 60:40 (2) having a melting point of at least 50° C. and having overall from 1.3 to 1.65 total hydrocarbon groups per silicon atom.

2. A composition in accordance with claim 1 in which (A) is a copolymer of dimethylsiloxane, diphenylsiloxane and methylvinylsiloxane, (B) is a reinforcing silica filler, (C) is dimethylsiloxane, and (D) is monophenylsiloxane.

3. As an article of manufacture, a vulcanized organosiloxane rubber consisting essentially of
    (1) a vulcanized organopolysiloxane consisting essentially of
        (A) a polymeric diorganosiloxane in which the substituents are selected from the group consisting of methyl, phenyl, vinyl and RCH$_2$CH$_2$— radicals, in which R is a perfluoroalkyl radical, at least 30% of said substituents being methyl, and
        (B) a filler for (A), and
    (2) dispersed throughout (1) from 10 to 65% by weight based on the weight of (A) of an organopolysiloxane resin consisting essentially of
        (C) blocks of siloxane units of the formula

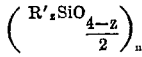

in which $n$ has an average value of from 6 to 100 inclusive, $z$ has an average value from 1.9 to 2 inclusive and R' is selected from the group consisting of methyl and phenyl radicals, there being no more than 10 mol percent phenylsiloxane in (C), and
(D) blocks of the formula

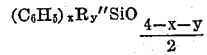

in which $x$ has an average value from .9 to 1.2, R'' is a lower alkyl radical and $y$ has a value from 0 to .1, the prime mol ratio of (C) to (D) being from 30:70 to 60:40 inclusive, (2) having a melting point of at least 50° C. and having overall from 1.3 to 1.65 inclusive total hydrocarbon groups per silicon atom.

4. A vulcanized rubber in accordance with claim 3 in which (A) is a copolymer of dimethylsiloxane, methylvinylsiloxane and diphenylsiloxane, (B) is a reinforcing silica filler, (C) is dimethylsiloxane, and (D) is monophenylsiloxane.

5. As an article of manufacture, a heat shrinkable article comprising
    (1) a vulcanized organosiloxane rubber consisting essentially of
        (A) a polymeric diorganosiloxane in which the substituents are selected from the group consisting of methyl, phenyl, vinyl and RCH$_2$CH$_2$— radicals in which R is a perfluoroalkyl radical, at least 30% of said substituents being methyl, and
        (B) a filler for (A), and
    (2) dispersed throughout (1) from 10 to 65% by weight based on the weight of (A) of an organopolysiloxane resin consisting essentially of
        (C) blocks of the formula

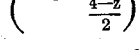

in which $n$ has an average value from 6 to 100 inclusive, $z$ has an average value from 1.9 to 2 inclusive, and R' is selected from the group consisting of phenyl and methyl radicals, there being no more than 10 mol percent phenylsiloxane in (C), and (D) blocks of the formula

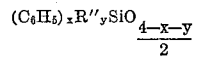

in which $x$ has an average value from .9 to 1.2 inclusive, $R''$ is a lower alkyl radical, and $y$ has a value from 0 to .1 inclusive, the prime mol ratio of (C) to (D) being from 30:70 to 60:40 inclusive, (2) having a melting point of at least 50° C. and having overall from 1.3 to 1.65 inclusive total hydrocarbon groups per silicon atom.

6. An article in accordance with claim 5 in which (A) is a copolymer of dimethylsiloxane, diphenylsiloxane and methylvinylsiloxane, (B) is a reinforcing silica filler, (C) is dimethylsiloxane, and (D) is monophenylsiloxane.

References Cited

UNITED STATES PATENTS 3,294,718  12/1966  Antonen _____ 260—18

MORRIS LIEBMAN, *Primary Examiner.*

JULIUS FROME, *Examiner.*

S. L. FOX, *Assistant Examiner.*